United States Patent
Tsihlas

(10) Patent No.: US 7,013,940 B2
(45) Date of Patent: Mar. 21, 2006

(54) DEVICE FOR ATTENUATING CAVITY NOISE IN A TIRE AND WHEEL

(75) Inventor: Dimitri Tsihlas, Greenville, SC (US)

(73) Assignee: Michelin Recherche et Technique S.A., (SE)

( * ) Notice: Subject to any disclaimer, the term of this patent is extended or adjusted under 35 U.S.C. 154(b) by 0 days.

(21) Appl. No.: 10/679,233

(22) Filed: Oct. 3, 2003

(65) Prior Publication Data
US 2004/0066083 A1    Apr. 8, 2004

Related U.S. Application Data

(63) Continuation of application No. PCT/US01/12739, filed on Apr. 19, 2001.

(51) Int. Cl.
B60C 19/00    (2006.01)

(52) U.S. Cl. .............................. 152/381.6; 152/154.1; 301/6.91

(58) Field of Classification Search ............... 301/6.91; 152/153, 154.1, 381.5, 381.6
See application file for complete search history.

(56) References Cited

U.S. PATENT DOCUMENTS

| | | | |
|---|---|---|---|
| 3,270,794 A | * | 9/1966 | Skidmore ................ 152/153 |
| 4,159,730 A | * | 7/1979 | Osada et al. ............. 152/158 |
| 4,392,522 A | | 7/1983 | Bschorr |
| 4,399,851 A | | 8/1983 | Bschorr |
| 4,480,669 A | * | 11/1984 | Skidmore ................ 152/153 |
| 6,309,026 B1 | | 10/2001 | Svedhem |
| 6,343,843 B1 | * | 2/2002 | Nishikawa ............... 301/6.91 |
| 6,450,225 B1 | * | 9/2002 | Yukawa et al. .......... 152/381.6 |
| 6,533,009 B1 | * | 3/2003 | Aoki ..................... 152/381.6 |
| 6,598,636 B1 | | 7/2003 | Schumann et al. |
| 6,755,483 B1 | * | 6/2004 | Yukawa et al. .......... 301/6.91 |

FOREIGN PATENT DOCUMENTS

| | | |
|---|---|---|
| DE | 019806935 A1 * | 9/1999 |
| DE | 19819128 | 1/2000 |
| EP | 1092567 A | 4/2001 |
| JP | 4285221 | 9/1992 |
| WO | WO 9835843 A | 8/1998 |
| WO | WO 9955542 | 11/1999 |

* cited by examiner

Primary Examiner—Russell D. Stormer
(74) Attorney, Agent, or Firm—E. Martin Remick; Adam Arnold

(57) ABSTRACT

A device for attenuating noise generated in a rolling tire and wheel assembly includes strips arranged as a circumferential ring in the tire/wheel cavity. The strips are spaced circumferentially to provide a profile of ridges and gaps in the ring. The rings may be placed on the interior surface of the tire or the wheel or both. Preferably, two rings are formed, and the gaps of the rings are in staggered relationship about the circumferential direction.

10 Claims, 4 Drawing Sheets

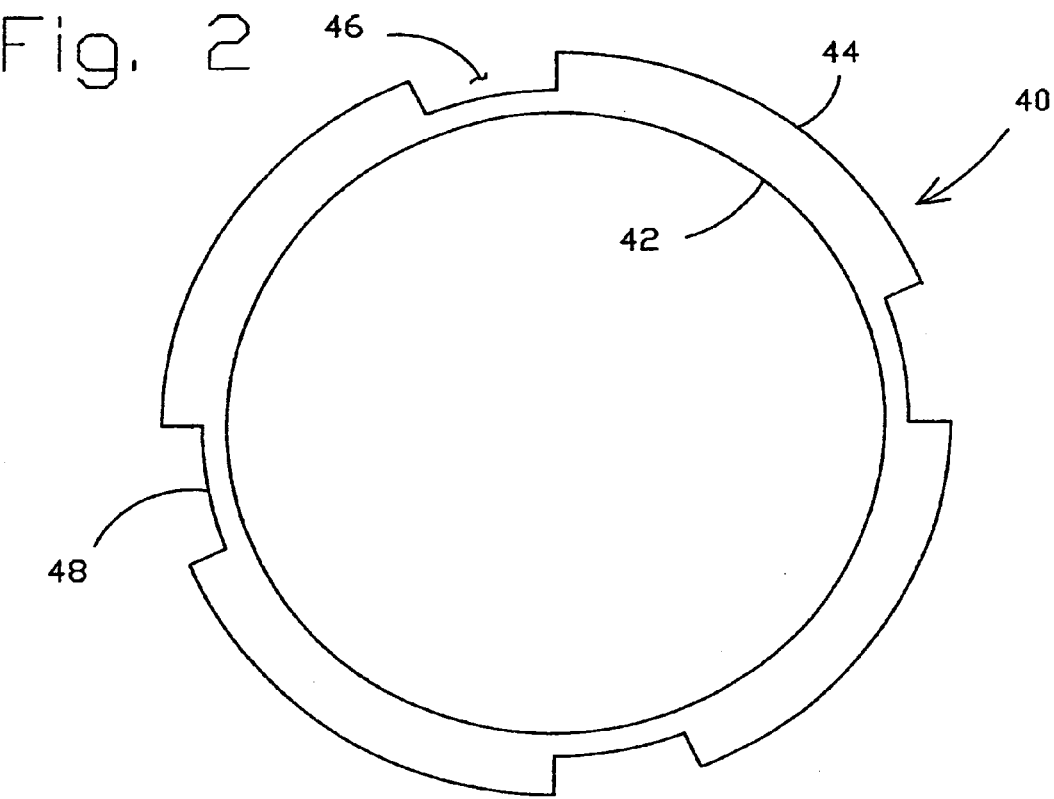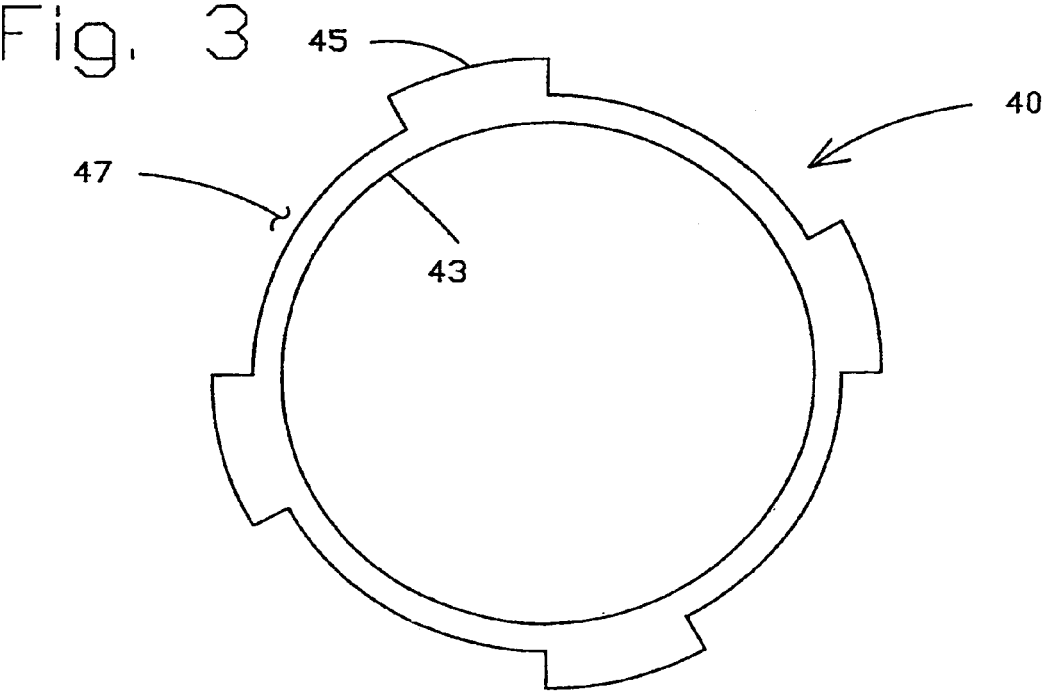

DEVICE FOR ATTENUATING CAVITY NOISE IN A TIRE AND WHEEL

This is a Continuation of Application No. PCT/US01/12739, filed Apr. 19, 2001.

BACKGROUND AND SUMMARY OF THE INVENTION

The invention relates to devices for attenuating noise generated by rolling tire and wheel assemblies of the type defining a closed interior cavity, for example, pneumatic tire and wheel assemblies. More particularly, the invention relates to a device mounted in a tire cavity for attenuating noise relating to cavity vibration modes.

Cavity noise in tires is generated by the excitation of the air contained inside the closed tire cavity. Generally, the air is excited by the deflection of the tire tread and sidewalls when the tire is rolling. The air in the cavity, although confined in a toroidal cavity, acts as an air column under the effect of the excitation. Various solutions have been proposed to reduce or eliminate cavity noise, including Helmholtz resonators incorporated in the wheel and sound absorbing materials arranged in various configurations in the cavity. These solutions themselves have difficulties including high cost, manufacturability, and effectiveness.

The present invention proposes a solution for reducing cavity noise that is simple, inexpensive, easy to manufacture, and effective.

The invention starts from the point that a closed cavity defined by a tire mounted on a wheel defines a toroidal space which is substantially uniform in the circumferential direction. During rotation of the tire, the substantially uniform space acts as an infinitely long tube of air and allows standing acoustic waves to form in the cavity. The energy of the waves is transmitted through the wheel to the vehicle as noise. The inventor realized that while the acoustic wave can be thought of as a standing wave in the cavity, the rotating tire and wheel could be thought of as moving relative to the wave. Thus, by placing a device on the tire or wheel to interfere with the maximum and minimum peaks of a wave, the wave could be attenuated.

According to the invention, acoustic waves can be disturbed and the transmission of energy to the wheel attenuated by a device that provides non-uniformities in the cavity circumferential direction. Such a device, according to the invention, comprises at least one circumferential ring providing a non-continuous profile of alternating ridges and gaps. The at least one ring is located in the tire cavity on a surface of the tire or the wheel.

According to one embodiment, the ring is formed from a plurality of strips in circumferential alignment and mutually spaced to have one or more gaps. According to another embodiment, the ring is formed of a single strip having a plurality of ridges separated by gaps formed in the strip. It is believed that the profile of raised and lower surfaces (strips/ridges and gaps) moves through the acoustic wave so that ridge momentarily coincides with the wave peak, causing an interruption, and thus diminishing the noise generated by the tire cavity.

The number of the ridges and gaps is related to the order of the acoustic wave to be attenuated by the device. As will be understood by those skilled in the art, the first-order mode is a complete wave occurring once per revolution, meaning the wave will have two peaks, at a maximum and a minimum about the circumference of the tire. A ring in accordance with the invention for attenuating a first order mode vibration provides at least two equally spaced ridges and gaps. Preferably, the ring comprises four ridges and gaps, which is believed to facilitate the interrupting capability of the ring.

According to the invention, the alternating position of the ridges and gaps provides the improved waved interrupting function as compared to a continuous ring of absorbent material, as known in the art. The ridges and gaps can be of equal circumferential length. Alternatively, the ridges can be longer than the gaps, or the gaps longer than the ridges, the ridges being substantially of equal length, and the gaps being substantially of equal length.

According to a preferred embodiment of the invention, the ring is formed of sound absorbing material to assist noise reduction by absorbing some of the sound energy and not providing sound reflective surfaces.

According to an aspect of the invention, wave interruption can be improved by placing two rings in the tire cavity in parallel and mutually oriented so that the gaps in each ring are positioned relatively staggered about the circumference so as not to be aligned in the lateral or axial direction.

The rings may be positioned on the cavity-defining surfaces of the tire or the wheel or both. Preferably, the rings are located on the crown of the tire or the well region of the wheel between the bead seats so that mounting or dismounting the tire does not damage the strips.

The strips forming the rings are formed of a material capable of being mounted in the tire and withstanding the tire environment and stresses from rolling and other deflections. Rubber or plastic strips, metallic, textile, or composite materials can be placed in the tire cavity, understanding that non-flexible or rigid materials are more suitable for placement on the wheel rather than the tire.

The sound absorbing strips may be formed of any material capable of absorbing acoustic or vibration energy, for example, rubber, foamed rubber and plastic, cork, textiles, or felts.

BRIEF DESCRIPTION OF THE DRAWINGS

The invention will be better understood by reference to the following detailed description in conjunction with the appended figures, in which:

FIG. 2 is a side view of a ring according to a first embodiment formed of a single strip having longer ridges and shorter gaps;

FIG. 3 is a side view of a ring according to a second embodiment formed of a single strip having shorter ridges and longer gaps;

DETAILED DESCRIPTION

Figure 1:
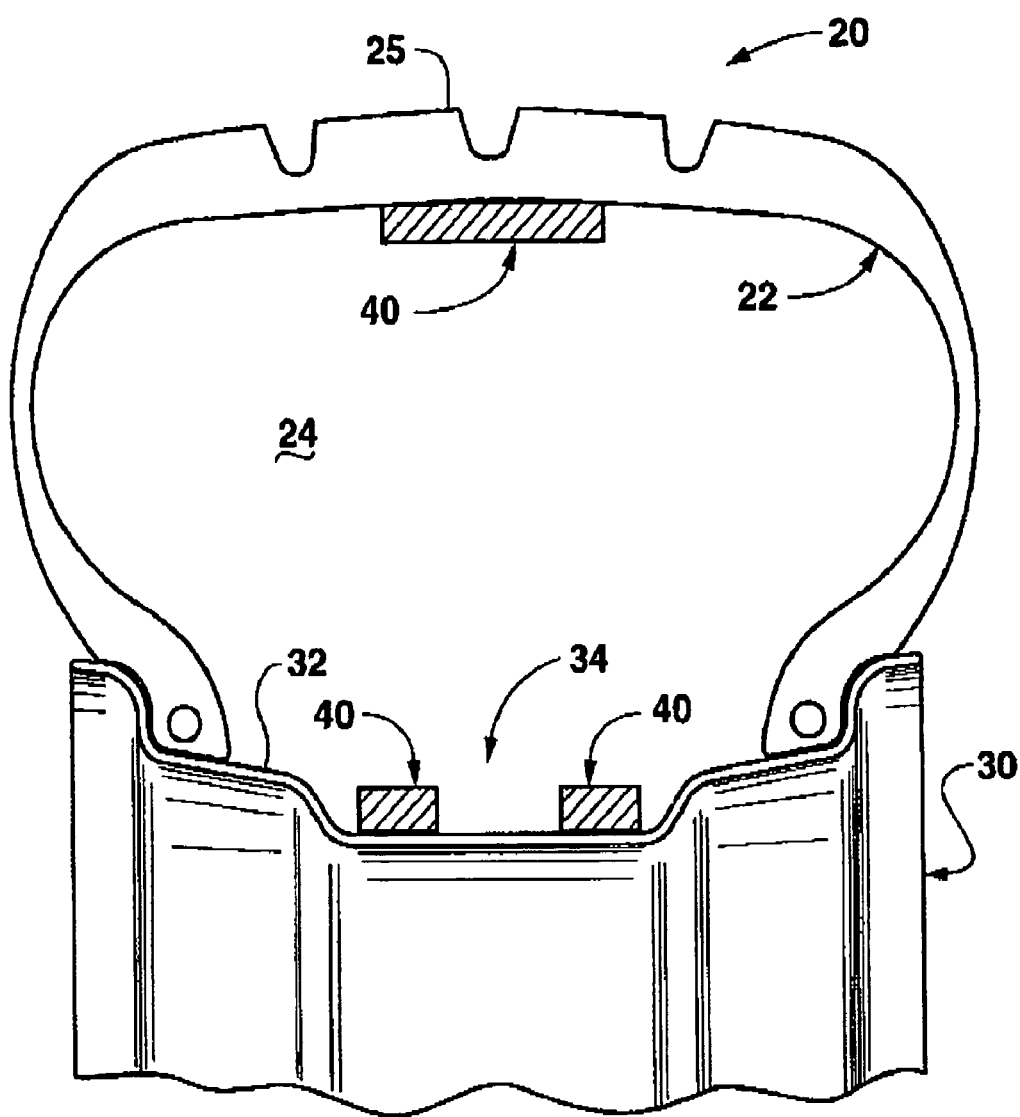
FIG. 1 is a radial sectional view of a tire and wheel showing the placement of rings in accordance with the invention.

FIG. 1 is a radial sectional view of a tire 20 and wheel 30. The interior surface 22 of the tire 20 and the interior surface 32 of the wheel 30 define the boundaries of a tire cavity 24.

In a pneumatic tire, the tire cavity 24 contains air under pressure that tensions the tire body to support the load on the tire and wheel assembly. The deflection of the tire 20 as it rolls in contact with the ground or encounters obstacles (not shown) transmits energy to the air in the tire cavity 24 which generates acoustic energy in the cavity air. Acoustic energy from the air is transmitted from the tire cavity as noise, which is undesirable.

Because the tire cavity is substantially uniform in the circumferential direction, the direction into the plane of FIG. 1, the acoustic energy can form so-called standing waves in the ring of air contained in the cavity. As will be understood by those skilled in the art, a standing wave has maximum and minimum peaks and zero pressure nodes. A first order wave completes one cycle of maximum and minimum peaks.

According to the invention, cavity noise can be attenuated by one or more profiled rings mounted in the tire cavity to make the interior space non-uniform in the circumferential direction. The ring may be a single strip of profiled material or a plurality of individual strips of material positioned in circumferential alignment, that is, forming a ring, as will be described.

According to the invention, the ring has a non-uniform profile along its length, the length corresponding to the circumferential direction in the tire cavity. The ring geometry, as will be further described below, comprises ridges separated by gaps defining a stepped radially outer surface. The ridges and gaps are formed with radially outer surfaces that extend circumferentially between step-like transitions, thus providing abrupt changes in profile between the ridge and the adjacent gap. The change in tire cavity circumferential profile as the ring rotates about the standing wave, which disturbs the wave, and accordingly attenuates the cavity noise. It is believed that positioning alternately the ridges and gaps with the peaks of the wave achieves the improved attenuation as compared to a continuous strip.

In FIG. 1, for purposes of illustration, a single ring 40 is shown on the inner surface 22 of the tire crown 245 and two rings 40 are shown mounted to the surface 32 of the wheel 30, more specifically within the wheel well 34. The rings 40 may be positioned anywhere on the interior surface of the tire 20 or the wheel 30, preferably, but not exclusively, on the crown or wheel well, as described below. Two or more rings may be provided and mounted on either or both of the tire or wheel, as further described below. In addition, the rings 40 may be relatively narrow, as shown, or have the full width of the mounting surface, the crown or wheel.

Figure 6:
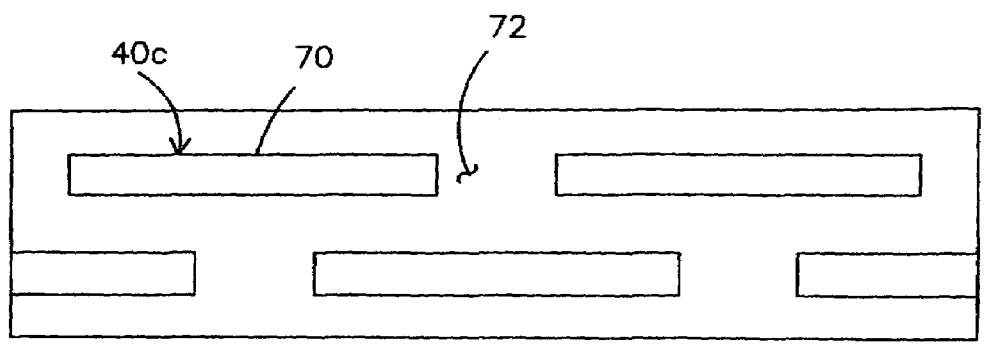
FIG. 6 is a projection of a wheel in a single plane showing a ring with two ridges.
Figure 7:
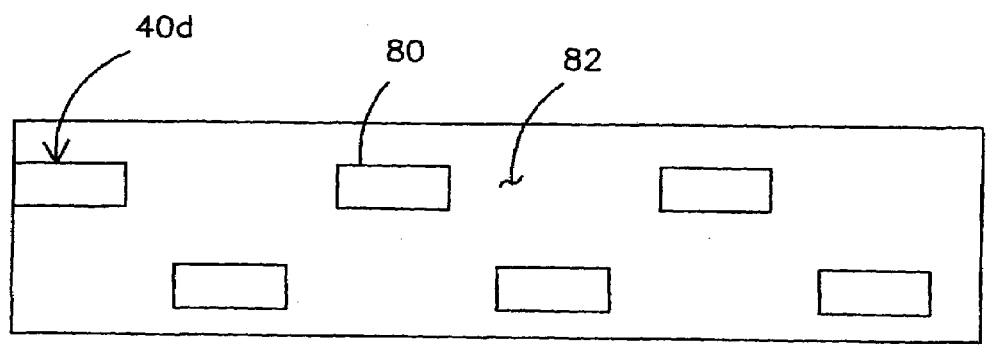
FIG. 7 is a projection of a wheel in a single plane showing a ring with three ridges.

According to one embodiment of the invention, the circumferential ring comprises a single strip having at least two ridges separated by two gaps as seen along the length or circumference. A preferred embodiment, illustrated in FIGS. 2, 3, and 4, has rings of four ridges and four gaps separating the ridges. For attenuating first order acoustic modes, the ring 40 preferably comprises two, three, or four ridges and gaps, which facilitates positioning a ridge with a wave peak during tire and wheel rotation. For other order acoustic modes, multiples of four ridges and gaps will be suitable. By way of further example, rings 40c and 40d in FIGS. 6 and 7 respectively illustrate rings having two and three ridges and gaps.

The ridges and gaps each have a substantially constant height, as measured in the radial direction. Preferably, a height of the gaps 46 occupies at least half the height of the ridges 42. That is, the base 48 of the strip 42 at the gap 46 is less than half the height of the ridge 44.

FIG. 2 shows ridges 44 that are relatively much longer than the gaps 46. This is believed to facilitate the wave interrupting capability by having a relatively long dwell time of the ridge at the wave peak maximum and minimum. The ridges 44 have substantially equal length, and the gaps 46 are of a different, substantially equal length. Alternatively, the ridges and gaps may be of a single substantially equal length.

FIG. 3 shows another alternative, a ring 41 formed of a single strip 43 having alternating ridges 45 and gaps 47, in which the ridges 45 are relatively much shorter than the gaps 47. Again, in this embodiment, the ridges 45 are of substantially an equal length and the gaps are of a different, substantially equal length.

The strips 42, 43 may easily be formed by a tape or ribbon having blocks bonded thereto and mutually spaced. The strips 42, 43 alternatively could be molded or machined, depending on the material used.

According to another embodiment, illustrated in FIG. 3, the ring 40 comprises individual strips 50 mounted directly to the tire or the wheel surface in circumferential alignment and mutually spaced. The spacing between strips 50 forms the gaps 52 that interrupt the profile of the strips.

Figure 4:
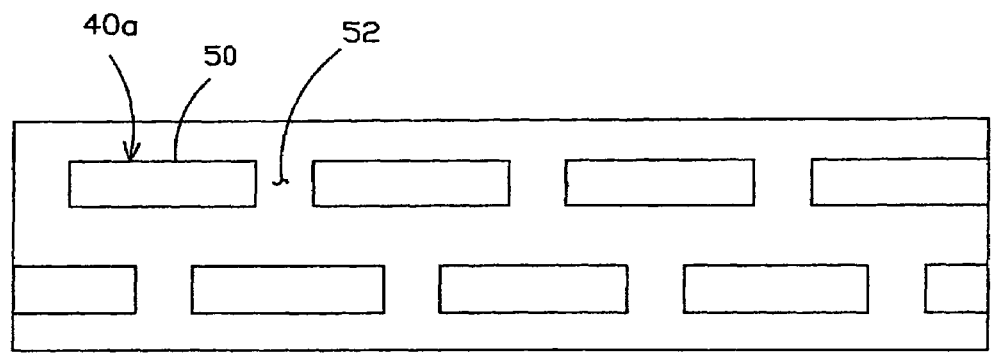
FIG. 4 is a projection of a wheel in a single plane showing a circumferential arrangement of two rings of long ridges, each formed of a plurality of strips.

According to a preferred embodiment of the invention illustrated in FIGS. 2 and 4, the ridges 44, 50 are longer than the gaps 46, 52, and the gaps each have a length being a minimum of about 0.01% of the circumference of the surface on which the rings 40 are mounted. For the interior crown surface of passenger tires, the gaps will typically be about 2 mm. A maximum gap is about 15% of the circumferential distance of the mounting surface. Again, for mounting on the interior crown surface of passenger tires, this will be about 200 mm between ridge 44, 50 ends.

According to another aspect of the invention, two or more rings 40 may be mounted in parallel in the cavity 24, which, as shown in FIG. 1, could be on the tire inner surface 22 or the wheel inner surface 32, or both.

In an unloaded tire, a single first-order wave will set up having its maximum and minimum at 180 degrees separation. A tire under load, however, will have two first-order waves because the loaded tire has a different diameter in the vertical direction (which includes the contact patch) than the diameter in the fore-aft direction. On a graph of sound pressure vs. frequency, these waves will appear as two sharp peaks of similar sound pressure value in close frequency proximity. The maxima and minima of the two first-order waves in the loaded tire are equally spaced and are relatively out of phase by 90 degrees.

Figure 5:
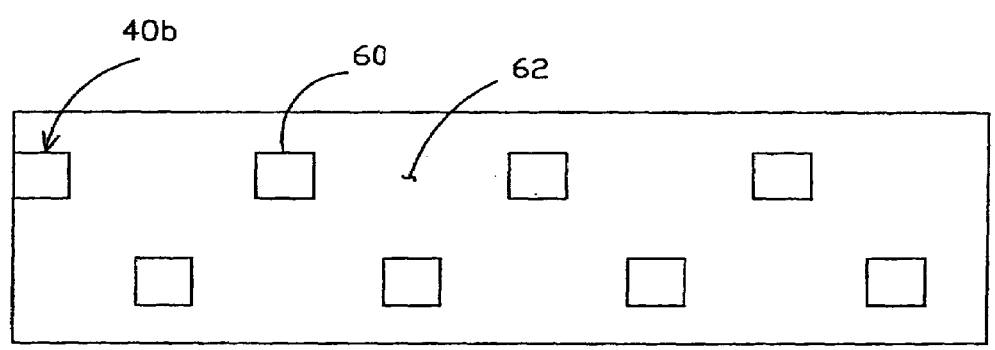
FIG. 5 is a projection of a wheel in a single plane showing a circumferential arrangement of two rings of short ridges, each formed of a plurality of strips.

Referring now to FIG. 4 and FIG. 5, which represent projections of the wheel inner surface 32 onto the plane of the drawing sheet, an advantageous arrangement includes two rings 40a and 40b mounted in parallel. FIGS. 4 and 5 illustrate the rings 40a and 40b as being formed of individual strips 50, 60 forming the ridges, however, the rings may also take the single strip form 42, 43 above. The ridges 50, 60 are arranged so that the gaps 52, 62 defined between circumferentially adjacent ridges 50, 60 are in staggered relationship, that is, non-aligned in the lateral or axial direction. Preferably, the gaps and ridges are staggered 90 degrees out of phase. This arrangement improves the wave interrupting function of the rings 40a and 40b by its capability of interfering with both of the first-order waves. As will be appreciated by those skilled in the art, this principle could be easily extended to other sound at other frequency modes by mounting rings having ridges in the appropriate multiple of 4.

According to another aspect of the invention, the number of strips 50 in each ring 40 can be the same, as shown in FIG. 3, or, alternatively, can be different, that is, two strips in one ring and four strips in a second ring.

The rings 40 may be placed in the wheel well, as shown in FIG. 1, to avoid subjecting the strips or ridges to stress during rolling of the tire. However, the rings 40 may be placed on the interior surface 22 under the crown 25, which is advantageous in avoiding damage to the rings when mounting the tire on the wheel.

The strips 42, 50 may be formed of rubber or plastic, metallic, or composite materials that are suitable for placing in a tire cavity. As will be understood, non-flexible materials are more suitable for placement on wheel and the flexible materials more suitable for the tire. The strips may be solid or hollow, a hollow strip having the advantage of saving weight.

According to a preferred embodiment, the strip 42 or strips 50 forming the ring 40 are made of sound absorbing material. Such strips may be formed of any material capable of absorbing acoustic or vibration energy, for example foamed rubber and plastic, cork, or felts. Sound absorbing strips are believed to assist the attenuation by absorbing energy which might otherwise be reflected.

The invention has been described in terms of preferred principles, structure and embodiments, however, those skilled in the art will understand that equivalents may be substituted for what is described without departing from the spirit or scope of the invention as defined in the claims.

What is claimed is:

1. A device for attenuating noise generated in a cavity of a pneumatic tire and wheel assembly, comprising at least a first and a second circumferential ring mountable to a interior surface of the tire and wheel assembly, each ring comprising at least two ridges in circumferential alignment and mutually circumferentially spaced to form gaps therebetween, each said ridge defining a raised, circumferentially-oriented surface extending between at least two radially-oriented surfaces, wherein gaps in the first ring are axially aligned with ridges in the second ring.

2. The device as claimed in claim 1, wherein each ring comprise three ridges.

3. The device as claimed in claim 1, wherein each ring comprises four ridges.

4. The device as claimed in claim 1, wherein each ring comprises a multiple of four ridges.

5. The device as claimed in claim 1, wherein the ridges of at least one ring are mutually circumferentially spaced at least 2 mm.

6. The device as claimed in claim 1, wherein the ridges of at least one ring are mutually circumferentially spaced not more than 200 mm.

7. The device as claimed in claim 1, wherein the first and second rings are both mounted to a surface of the wheel.

8. A device for attenuating noise generated in a cavity of a pneumatic tire and wheel assembly, comprising at least a first and a second circumferential ring mountable to a interior surface of the tire and wheel assembly, each ring comprising at least two ridges in circumferential alignment and mutually circumferentially spaced to form gaps therebetween, wherein gaps in the first ring are axially aligned with ridges in the second ring, and wherein the first ring is mounted to a surface of the wheel and the second ring is mounted to a surface of the tire.

9. The device as claimed in claim 1, wherein at least the ridges of first and second rings are formed of sound absorbing material.

10. A device for attenuating noise generated in a pneumatic tire and wheel assembly, comprising at least two rings each mountable to a surface of the wheel defining an interior space of the assembly, each ring comprising a strip having at least two ridges in circumferential alignment and mutually circumferentially spaced to form gaps of at least 2 mm therebetween, each strip being formed of sound absorbing material, each said ridge defining a raised, circumferentially-oriented surface extending between at least two radially-oriented surfaces, the at least two rings being mutually oriented so that gaps in one ring are axially aligned with ridges in the other ring.

* * * * *